United States Patent [19]
Polcer

[11] Patent Number: 4,768,191
[45] Date of Patent: Aug. 30, 1988

[54] DIGITAL DATA AND ORDERWIRE COMBINER APPARATUS

[75] Inventor: Anton J. Polcer, Sussex, N.J.

[73] Assignee: ITT Corporation, Defense Communications Division, Nutley, N.J.

[21] Appl. No.: 913,915

[22] Filed: Oct. 1, 1986

[51] Int. Cl.$^4$ ................................................ H04J 3/00
[52] U.S. Cl. .................................................. 370/112
[58] Field of Search ............................ 370/110.4, 112; 307/264, 456, 473, 498, 529

[56] References Cited

U.S. PATENT DOCUMENTS 3,943,284  3/1976  Nelson .................................. 370/112

Primary Examiner—Douglas W. Olms
Assistant Examiner—Min Jung
Attorney, Agent, or Firm—Robert A. Walsh; Thomas N. Twomey; Mary C. Werner

[57] ABSTRACT

A digital data and orderwire combiner employs a first and a second inverting gate amplifiers. The first amplifier receives the orderwire signal which is a low rate digital signal, while the second amplifier receives the data signal which is of a higher rate. The amplifiers have a common ground return where current through the amplifiers is directed through a resistive impedance network. The amplifiers as coupled together providing a 3-level amplitude modulated signal indicative of the combined data and orderwire signal. In order to reduce jitter, a portion of one of the signals is directed from one amplifier to the other. The configuration assure low jitter operation while producing reliable voltage levels indicative of 3-level amplitude modulation.

14 Claims, 2 Drawing Sheets

DIGITAL DATA AND ORDERWIRE COMBINER APPARATUS

The Government has rights in this invention pursuant to Contract No. DAAB07-82-C-J115 awarded by the Department of the Army.

BACKGROUND OF THE INVENTION

This invention relates to a digital data and orderwire combiner apparatus particularly adapted to operate with a fiber optic information transmission system.

Fiber optic systems using glass fiber guides are extensively employed as communication means. In regard to such systems as for example a communications system, the objective is to transfer information from one point to another point which points or terminals are remotely located. The transfer of information is accomplished by modulating the information onto a carrier wave which is then transmitted or propagated to the receiving sight where the information is recovered by a demodulation process.

There are many advantages in communicating with optical frequencies in regard to an increase in information that can be transmitted over an optical link plus lower power dissipation plus more reliable transmissions in regard to RF noise and so on. Thus the field of optical communications has been rapidly developing. In regard to this, optical communication systems are widely employed both in industrial and military use.

In regard to military applications, most communications equipment used by the military possesses a similar signal format. This information consists of a data signal where the data rate can be from 72,000 BPS to 2.304 MBPS. The data signal is linearly added to an orderwire signal. Orderwire is defined as a low speed data or voice channel used for maintenance or setup purposes.

As one can ascertain from the prior art, there are many types of orderwire signals. There is a digital signal which is known as system orderwire or Combined Voice Digital Orderwire and sometimes referred to as a CVDOW signal. There are also analog orderwire signals.

In any event, one requires combiners which esssentially operate reliably to transmit the combined or traffic signal over a cable or to apply the signal to a suitable laser diode for subsequent transmission over fiber optic link. The circuit that performs the data combination with the orderwire signal must be reliable in operation and must exhibit excellent operating properties over wide temperature ranges while avoiding impressing undue jitter or phase delays in regard to the combined signal.

Such considerations require a circuit or a digital data orderwire signal combiner at the transmission end which circuit functions to cancel many offset errors which are inherent in prior art circuits while minimizing signal jitter due to the orderwire which is conventionally at a lower frequency than the data signal. As one can ascertain, a typical optical communication system has one or more data sources where the output is modulated onto an optical carrier. The carrier is then transmitted as an optical light field or a beam through the optical channel which is for example an optical fiber. At the receiver, the field is optically collected and processed by the use of a photodetector or other device.

In regard to such systems, the source for light transmission includes semiconductor lasers and LED devices. LED's are adequate for data links and are extensively used in the field of optical communications. As such, longer wavelength LED's are also employed for major transmission roles. In any event, there is a problem with LED devices in that they exhibit non-linearities in operation particularly when they are operated at high current levels to produce high power outputs. Thus the circuit which operates to drive the LED must be capable of driving the relatively low impedance device with sufficient amplitude and linearity. the circuit must also possess good stability over wide temperature ranges while exhibiting low jitter so as not to produce undue interference in the transmitted signal.

It is therefore and object of the present invention to provide an improved digital data orderwire signal combiner which is utilized in a fiber optic communications link at a transmitting end.

It is further object of the present invention to provide a data and orderwire combiner which is reliable over a wide temperature range and is capable of driving a cable or a LED device in a reliable and consistent manner.

BRIEF DESCRIPTION OF THE PREFERRED EMBODIMENT

A digital data and orderwire combiner apparatus for combining a high rate digital data signal with a lower rate digital orderwire signal to provide at an output a combined signal having three distinct levels comprising first inverting gate amplifier means having an input adapted to receive said orderwire signal and having an output to provide an amplified version thereof, said gate having a control output terminal through which current flows, second inverting gate amplifier means having an input adapted to receive said high rate digital data signal and having an output to provide an amplified version of said signal and having a control output terminal through which current flows, a resistive divider including a first resistor having one terminal coupled to a point of reference potential and a second terminal coupled to both control terminals of said first and second gate amplifier means and including a second resistor coupled to said second terminal of said first resistor and having another terminal coupled to a point of potential of a given polarity, and means coupling one of said digital signals as applied to one of said amplifier means to said other amplifier means to cause said three levels to be clearly defined one from the other according to the binary value of one of said signals with respect to the other.

DETAILED DESCRIPTION OF THE FIGURES

Figure 1:
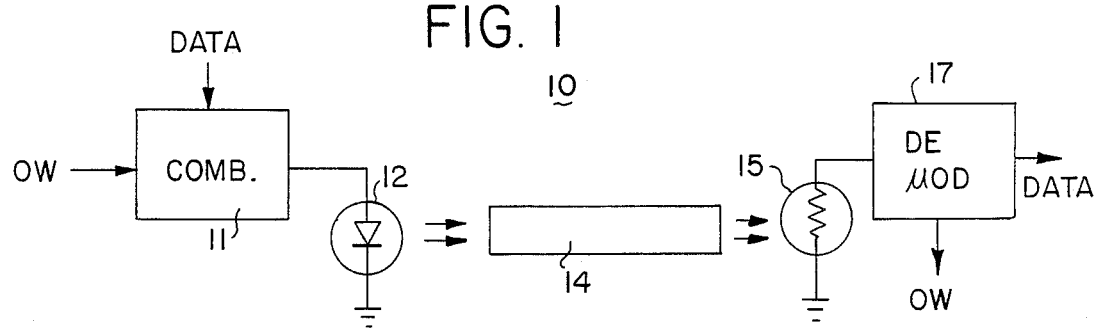
FIG. 1 is a simple schematic diagram showing an optical communication system employing a combiner for data and orderwire according to this invention.

Referring to FIG. 1, there is shown a simple block diagram of a typical optical communications system 10.

Essentially, there is shown a combiner 11 which combiner operates to combine a data input signal which is a digital signal at a relatively high data rate with a lower rate orderwire (OW) signal. the combiner 11 receives the OW signal as well as the data signal. The orderwire signal is employed for test purposes or maintenance purposes of the optical information system or any other communiation system. As will be explained, the combiner 11 designated as a digital data and orderwire combiner provides a composite signal indicative of the high speed data carrier combined with the orderwire signal.

As will be explained, the combiner also operates to provide this signal with a minimum of jitter, which based on the prior art techniques is at the orderwire frequency. An example of a prior art circuit can be had by referring to U.S. patent application, Ser. No. 678,449 filed on Dec. 5, 1984 for R. Goeb et al. and entitled HIGH RATE MODULATOR FOR FIBER OPTIC SYSTEM. This patent application has matured into U.S. Pat. No. 4,602,223 which shows a digital data and orderwire modulator which is suitable for optical transmission systems. In any event, the circuit shown in that application has problems in regard to phase jitter and stability as will be subsequently explained. Thus as shown in FIG. 1, the output of the combiner 11 is applied by conventional circuit means to an LED transmitter 12 whereby the modulated signal is converted into an optical frequency and transmitted along fiber 14 to a receiving site. The receiver includes a photodetector 15 which responds to the transmitted modulated light signal to develop the voltage output corresponding to the optical signal transmitted along the fiber 14. Photodetectors as 15 are well known in the field of optical communications, and for example, such detectors are based on established silicon technology.

There are many devices for detecting optical signals such as P-I-N detectors employing GaAs and various other materials. The output of the photodetector 15 is applied to a demodulator circuit 17 where the demodulator operates to recover the high speed data signal as well as the orderwire signal for the use in processing by the communications system.

As indicated, the circuit to be described in conjunction with the following Figures may operate to either drive an LED device as for example shown in FIG. 1 or may operate to drive a conventional cable. The output impedance of the circuit is extremely low and is capable for example of operating with a 50 ohm cable or a typical LED device as employed in conventional optical communications systems.

Figure 2:
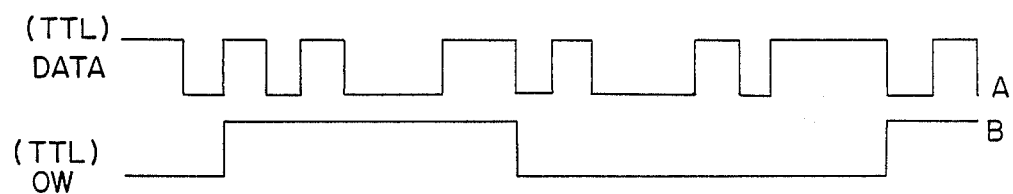
FIG. 2 depicts waveforms A and B indicative of a typical data and orderwire signal.

Referring to FIG. 2A, there is shown a typical data signal which is employed in such communication systems. In a typical system the data signal as shown in FIG. 2A is at a rate of 18.72 MBPS or 20.206933 MBPS.

Referring to FIG. 2B, the orderwire signal which is a maintenance orderwire signal is a voice signal which has been digitized using conventional digital modulation techniques and is for example a diphase modulated signal at 16 KBPS. As indicated above, it is the main object of the combiner as 11 of FIG. 1 to adequately combine the data and orderwire signal in order to obtain an output signal which possesses information concerning the conditions of both the data and the orderwire signal. The circuit as indicated should operate reliably over a wide ambient range in regard to voltage and temperature and also be capable of operating with low jitter.

As can be seen from FIG. 2A, the data signal is designated as a TTL signal but can also be a NRZ signal. The term NRZ standing for non return to zero and is a conventional way of transmitting digital data. The signals are normally derived from circuitry whichis of the TTL type. The term TTL defines a commonly used logic circuitry and is referred to as transistor transistor logic thus arriving at the acronym TTL. This circuitry is widely employed because it has an extremely fast switching time as compared to other logic circuits and employs NAND gates as being the basic logic element. TTL circuits usually make use of a transistor which has several emitters and many examples of such circuits are known and shown in the prior art.

Further examples of suitable circuits can be had by referring to a text entitled *Digital Circuits With Microprocessor Applications* by Paul M. Chirlian, published by Matrix Publishers, Inc. (1982). See the appendix entitled Logic Families, particularly pages 392 to 394. There is shown a basic TTL NAND circuit which has an input consisting of a multi-emitter transistor whose collector electrode is coupled to a amplifier employing a transistor with an output amplifier. This is typical of such TTL circuits that are available in the prior art.

Figure 3:
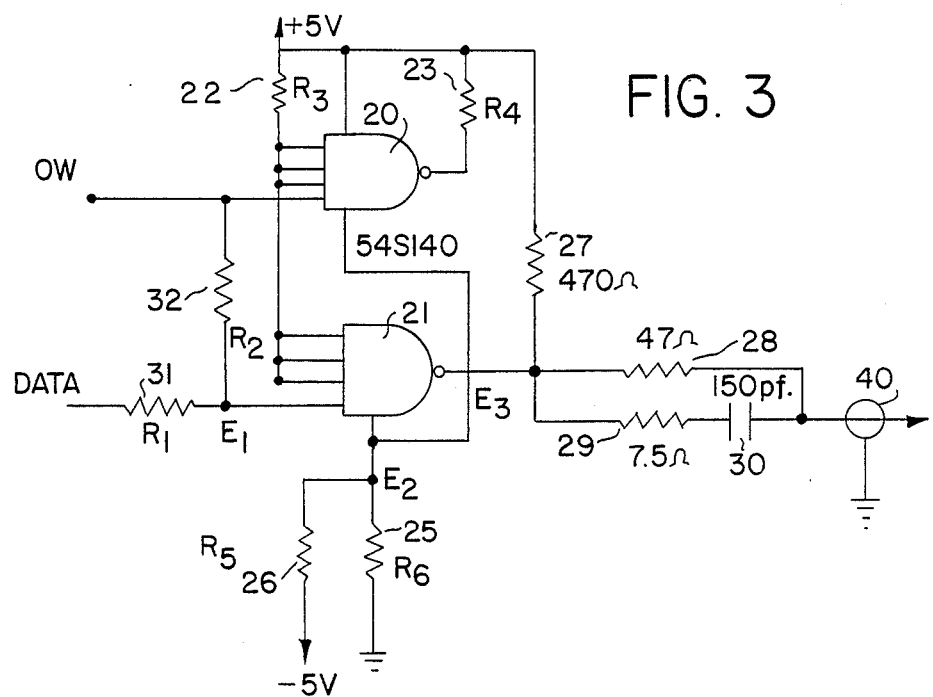
FIG. 3 is a detailed circuit diagram showing one embodiment of a combiner according to this invention.

Referring to FIG. 3, there is shown a digital data and orderwire combiner circuit according to this invention. Before proceeding with an explanation, it is noted that FIG. 3 utilizes component values in certain instances and also utilizes particular voltage supply levels which are essentially compatible with integrated circuits such as +5 volts and −5 volts. As one can ascertain from FIG. 3, there is shown two NAND gates which essentially are gates 20 and 21. Both NAND gates are conventional integrated circuits and are available from many manufacturers. The gates are sold for example by many manufacturers under the nomenclature of 54 S 140. As seen, NAND gate 20 which essentially is an inverting gate amplifier is typical of TTL NAND gate circuitry as for example that circuit shown in the above-noted textbook.

The NAND gate 20 has three input terminals coupled together and directed to a source of potential which is +5 volts through a resistor 22 also designated as $R_3$. the remaining input to the NAND gate 20 is directly coupled to the orderwire or OW signal as that signal shown in FIG. 2B. The gate also receives bias from the +5 volt supply and has its output coupled through a load resistor 23 to the source of operating potential. The resistor 23 is designated as $R_4$. A second gate 21 is shown. Gate 21 is of identical configuration as gate 20 and is a gate available for example on the same integrated circuit. The gate 21 has the three inputs tied together which are connected to the three tied inputs associated with gate 20.

The ground return for gate 20 is coupled to the ground return for gate 21 at the terminal designated as E2. There are shown two resistors coupled to this terminal. A first resistor 25 also designated as $R_6$ directs current to a point of reference potential such as ground. A second resistor 26 is coupled to the terminal point E2 and has another terminal coupled to a negative source of potential as −5 volts. The gate 21 provides an output signal designated as E3 and has its output coupled through pull-up resistor 27 to the +5 volt supply. Also coupled to the output of gate 21 is a parallel combination of resistor 28 in parallel with the series combination of resistor 29 and capacitor 30. Resistor 28 operates as an impedance matching device where resistor 29 and capacitor 30 act as a compensating network.

Figure 4:
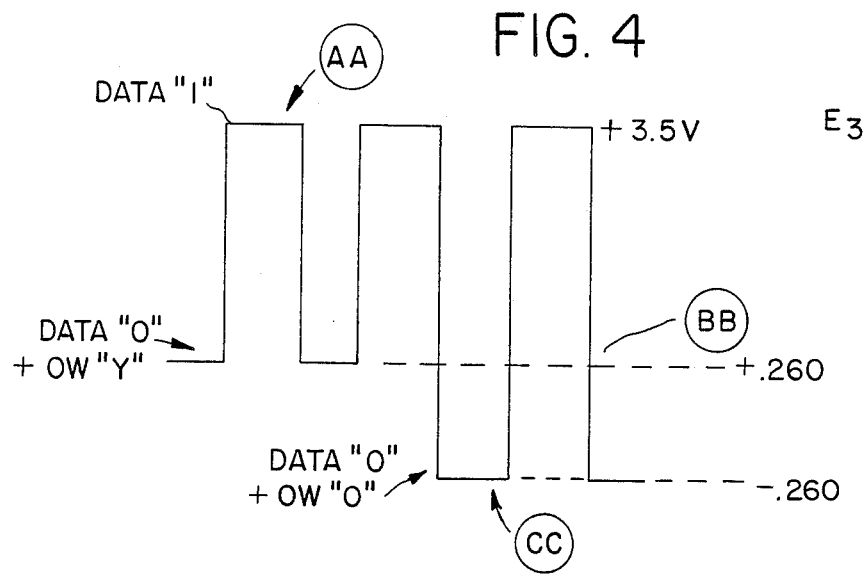
FIG. 4 is a timing diagram shown the nature of the output signal provided by combiners which operate according to the principles of this invention.

Essentially, these components serve to provide rise time and overshoot compensation for long cable lengths such as cable 40 which is coupled to the output junction of resistor 28 and capacitor 30. The cable 40 can be directed as indicated to an LED device for modulation of the device according to the output waveform which is provided by the circuit of FIG. 3, or the output can be directly coupled to a shielded cable for direct transmission to a receiving site without the use of an LED modulator. The waveform provided at the output E3 of the circuit of FIG. 3 is shown in FIG. 4.

The NAND gate 21 receives at its input terminal the data input which is directed via a resistor 31. The other terminal of resistor 31 designated as E1 is directed through a resistor 32 which is positioned between the orderwire or OW input to NAND gate 20 and to the input of NAND gate 21 which receives the data signal of FIG. 2A via resistor 31.

The circuit shown in FIG. 3 produces an output signal which is the combination of the data and orderwire signal and incorporates a jitter minimizing circuit which will be explained. As one can ascertain by referring to FIGS. 3 and 4, certain conditions can occur. These conditions are as follows.

The data signal which is the input to NAND gate 21 can be at a one or a zero binary value. At the same time the orderwire signal can also be at a zero or one. Hence the output signal should provide an indication as to when the data signal is at one as well as indications indicating a data signal at zero and an orderwire signal at one and the orderwire signal is zero. This is shown in FIG. 4.

Essentially, as one can see from the waveform of FIG. 4, when the data signal is at one, the point E3 which is the output of NAND gate 21 is at +3.5 volts. When the data signal is at zero and the orderwire signal is at one, the output at E3 is at +0.260 volts. When the data signal is at zero and the orderwire signal is also at zero, the output of NAND gate 21 is at −0.260 volts. Hence as one can see from FIG. 4, there is a composite waveform which contains information as to the data signal as well as the orderwire signal.

The following conditions of operation are pertinent to the circuit shown in FIG. 3. First assume that the OW signal is at level one, while the data signal is at level zero. In this case the OW signal as applied to the input of NAND gate 20 causes current to flow via resistor 23 through resistor 25 ($R_6$) to ground. This causes the state during the OW one condition to rise to +0.260 volts as shown in FIG. 4. When the OW signal is at zero and the data signal is at zero, resistor 26 in conjunction with the −5 volt supply causes the potential at E2 to rise to approximately −0.260 volts. This, therefore, gives a definite voltage when both NAND gate 20 and NAND gate 22 have a binary zero at the inputs or a zero for the OW signal and a zero for the data signal.

In any event, as one can ascertain from the circuit of FIG. 3, the OW input signal is coupled to the input of NAND gate 21 via resistor 32 while the data signal is coupled to the input of NAND gate 21 via resistor 31. This feed-through scheme incorporating feeding of the OW signal via resistor $R_2$ to the input of NAND gate 21 and incorporating a feeding of the data signal via the same resistor to NAND gate 20 causes a change in the output voltage E3. In this manner as one can understand, the input voltage designated as E1 is changing. The change in input voltage compensates for the change in the threshold resulting from the OW current which produces a voltage change across resistor 25. This operation reduces the jitter at the output of NAND gate 21. It is noted that the OW signal as applied to gate 20 causes a current flow via resistor 25 whereby the composite signal is obtained from the output of gate 21. The ratio of the orderwire signal to the data signal times 100 percent is 15 percent for the circuit of FIG. 3.

Figure 5:
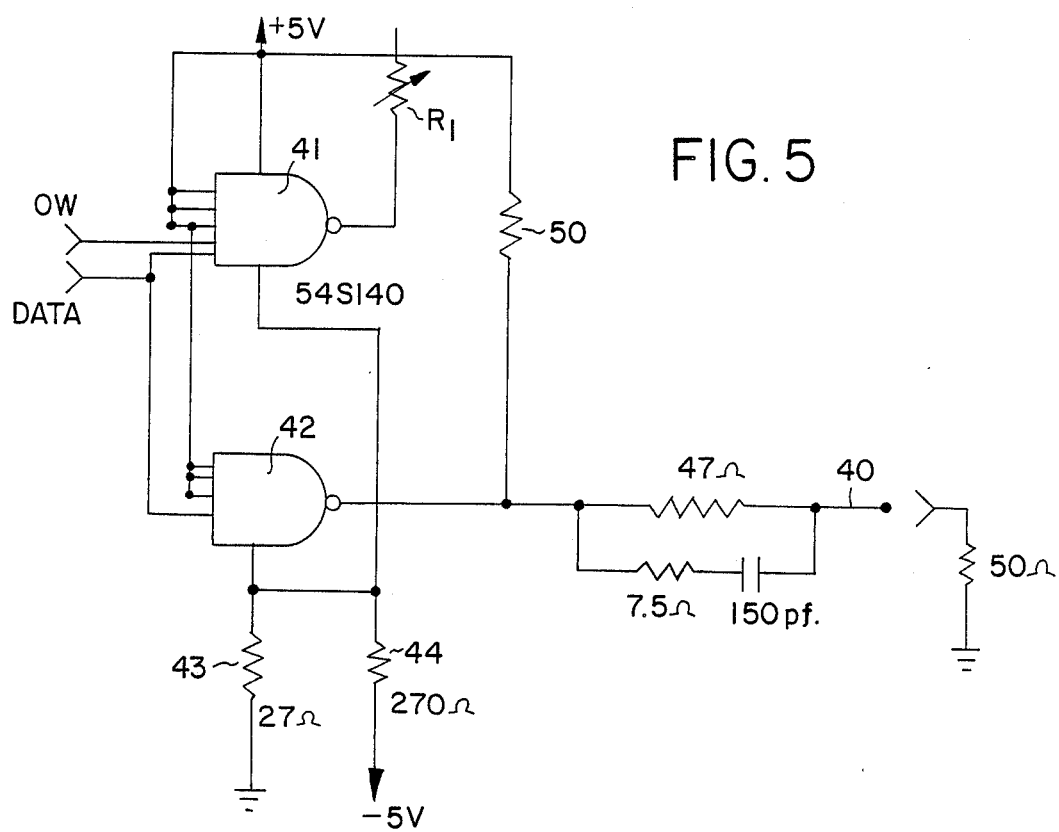
FIG. 5 is a detailed schematic diagram showing an alternate embodiment of a combiner for data and orderwire according to this invention.

Referring to FIG. 5, there is shown a alternate embodiment of a circuit which is capable of producing the waveforms shown in FIG. 4 by combining a data and an orderwire signal designated as data and OW. The data signal is a NRZ signal of TTL level, while the orderwire signal is a digitized voice signal also of TTL level. Essentially, there is shown in FIG. 5 two gates 41 and 42 which are NAND gates and are of the identical configuration as the gates 20 and 21 shown in FIG. 3 and can be implemented with the 54 S 140 integrated circuit.

As seen in FIG. 5, NAND gates 41 and 42 have all their common inputs connected together and connected directly to the +5 volt supply. NAND gate 41 receives as its input the OW or orderwire signal and receives at a second input the data signal. Thus the gate 41 acts as a true NAND gate and will provide an output signal only when the data and the OW signal are both the same binary value. The data signal is also directed to NAND gate 42 as a single input. The ground return from NAND gate 41 is directed through resistors 43 and 44 with resistor 44 connected to the −5 volts supply. Thus as one can see gate 41 provides a current via resistors 43 and 44. The output of the circuit is taken from the output of NAND gate 42 going through the impedance matching and compensating circuit as for example the circuit shown in FIG. 3 consisting of the resistor in parallel with the resistor capacitive combination to drive a cable having a 50 ohm impedance or a LED device coupled thereto. In any event, circuit operation of FIG. 5 can again be understood by referring to FIG. 4. In FIG. 4 there is shown in circles the nomenclature AA, BB and CC each representing the three state of the output traffic signal which is the signal directed to cable 40 via the output of NAND gate 42. In regard to the circuit components in FIG. 5, the variable resistor $R_1$ is selected to determine the voltage change between the state CC and the state BB. The resistor 44 operates to balance out the residual current during state CC of FIG. 4 so that the voltage during state CC is approximately equal to zero volts instead of for example −0.260 volts as for the circuit of FIG. 3. The resistor 43 is selected to determine the voltage sensitivity to a change from the state CC to the state BB and hence as shown in FIG. 5, resistor 43 is about 1/10 the value of resistor 44.

For all purposes the resistor designated by reference numeral 50 is extremely large compared to any other resistor value in the circuit. The circuit essentially operates as follows. With the particular NAND gate configuration consisting of gates 41 and 42, the typical output of the circuit is low for a total current flow of 34 milliamps which essentially requires 17 milliamps for gate 41 and gate 42. The total output of the circuit would be at a high value for a total current flow of 14 milliamps thereby requiring a current flow of 7 milliamps in gate 41 and 7 milliamps in gate 42. The traffic signal as depicted in FIG. 4 would be at level AA when the input OW signal is at a binary zero and the input data signal is at a binary zero. During these conditions, each of the NAND gates 41 and 42 would draw approximately 7 milliamps, therefore affording the circuit a total current draw of 14 milliamps and with the component values shown, specifying an output voltage of 1.5 volts at AA.

For the conditions CC the input OW signal is at the binary zero and the data signal is at binary one. In this condition gate 41 will be drawing approximately 7 milliamps while gate 42 is drawing approximately 17 milliamps, thus making a total draw of 24 milliamps. Hence during this condition, the resistor 43 is selected to determine the voltage sensitivity at this point wherein at state CC the approximate output voltage with the component values shown is close to zero volts. In any event, state AA also occurs when the input OW signal is at binary one and the input data signal is at binary one. In this condition both gates 41 and 42 each draw 7 milliamps for a total output current of 14 milliamps which corresponds to the exact condition when the input OW signal is at zero and the input data signal is at zero.

The state BB indicates that the input OW signal is at binary one and the input data signal is at binary zero, the total current drawn is approximately equal to 34 milliamps which essentially produces an output voltage of approximately 225 millivolts. Hence as one can see, the circuit of FIG. 5 also requires that the data signal be applied to gates 41 and 42 and that the common ground return for the gates occurs through the combination of resistor 43 and 44. In this manner jitter is also substantially reduced in regard to the output circuit. In the circuit of FIG. 5 the orderwire signal contributes current when both the OW signal and the data signal are the same value. Hence in FIG. 5 the synchronization of OW and data is assured. The circuit uses the current through the ground return to hold the CC state near ground. By doing this the threshold or turn-on and turn off values of the gates 41 and 42 is consistent and reliable.

Both circuits as shown in FIGS. 3 and 5 function to produce the waveform shown in FIG. 4 which is necessary for combining the data signal with the orderwire signal. In any event, the differences in operation between both circuits are as follows. In the circuit shown n FIG. 3, the resistors 31 and 32 should be adjusted each time the percentage of the orderwire signal in the traffic signal is changed by varying resistor 24 and/or the combination of resistors 25 and 26. The circuit shown in FIG. 5 required an initial selection of resistor 44 for nulling the current which flows through the circuit indicative of state CC of FIG. 4 so that the state CC approximates 0 volts.

The resistor $R_1$ is then adjusted to determine the percentage of orderwire signal whereby the percentage of orderwire signal is given by the following equation:

$$\% OW = \frac{BB - CC}{\frac{1}{2}[(AA - CC) + (AA - BC)]} \times 100\% =$$

The following table is also indicative of the test values for varying values of resistor $R_1$ and the computed percentage of orderwire is shown.

| | Test Values TRAFFIC | | | |
|---|---|---|---|---|
| $R_1$ | AA | BB | CC | Computed % OW |
| * 100Ω | 1.56 volts | .4 volts | 0 | 29.4% |
| 390Ω | 1.56 volts | .22 volts | 20 mv | 13.9% |
| ∞ | 1.56 volts | .12 volts | 20 mv | 6.7% |

The circuit components of FIG. 5 were subjected to testing utilizing heat guns to determine the change in output and also with respect to a freon coolant. Essentially, in regard to the heat test, the circuit exhibited no significant change in output. In any event, when the circuit was sprayed with coolant, there was a 60 millivolt drop in the AA level shown in FIG. 4 with no significant changes in the BB or CC levels.

In regard to conventional systems, the percentage of orderwire in the output traffic signal is preferably approximately 15 percent. As one can ascertain, the value of $R_1$ is selected to be somewhere between 100 and 390 ohms for the circuit of FIG. 5. Both circuit configurations as shown above, operate with extremely low orderwire jitter. Both circuits respond to the data signal or to the orderwire signal by means of supplying both NAND gates associated with the circuits the appropriate signal. The ground return for both NAND gates is taken through a combination of a low impedance resistor as for example resistor 25 and 43 of FIGS. 3 and 5 together with a higher value resistor as resistors 26 and 44 of FIGS. 3 and 5 which resistor is coupled to a point of negative reference potential. In this manner one can adjust the values accurately between the states as BB and CC depicted in FIG. 4, thus assuring proper discrimination and thereby assuring that the traffic signal will have three predetermined states while experiencing extremely low jitter.

The circuit of course is simple and inexpensive due to the fact that it utilizes conventional TTL NAND gate configurations which are available from many commercial sources. It is of course an extreme advantage in regard to both circuits that the NAND gates employed such as gates 20 and 21 of FIG. 3 and gates 41 and 42 of FIG. 5 are implemented on the same integrated circuit chip and therefore have been made by the same integrated circuit processes and therefore fluctuate in regard to temperature and so on in the same manner. This results in overall improved performance while significantly reducing the cost of the circuitry as for example implemented by prior art devices.

What is claimed is:

1. A digital data and orderwire combiner apparatus for combining a high rate digital data signal with a lower rate digital orderwire signal to provide at an output a combined signal having three distinct levels comprising:

first inverting gate amplifier means having an input adapted to receive said orderwire signal and having an output to provide an amplified version thereof, said gate having a control output terminal through which current flows, second inverting gate amplifier means having an input adapted to receive said high rate digital data signal and having an output to provide an amplified version of said signal and having a control output terminal through which current flows, a resistive divider including a first resistor having one terminal coupled to a point of reference potential and a second terminal coupled to both control terminals of said first and second gate amplifier means and including a second resistor coupled to said second terminal of said first resistor and having another terminal coupled to a point of potential of a given polarity, and means coupling one of said digital signals as applied to one of said amplifier means to said other amplifier means to cause said three levels to be clearly defined one from the other according to the binary value of one of said signals with respect to the other.

2. The digital data and orderwire combiner apparatus according to claim 1 wherein said output of said second inverting gate means is connected to a resistive termination for providing impedance matching.

3. The digital data and orderwire combiner apparatus according to claim 2, wherein said output of said second inverting gate means is also coupled to a load resistor having one terminal connected to said output of said second inverting gate means and one terminal connected to a source of operating potential.

4. The digital data and orderwire combiner apparatus according to claim 2, wherein said resistive termination is shunted by an R-C network to provide risetime and overshoot compensation.

5. The digital data and order combiner apparatus according to claim 3, wherein said first inverting gate means has said output terminal connected to one terminal of a load resistor, with said load resistor having a second terminal connected to said source of operating potential.

6. The digital data and orderwire combiner apparatus according to claim 1, wherein said resistive divider first resistor is substantially less in magnitude than said second resistor, with said second resistor coupled to a negative source of potential.

7. The digital data and orderwire combiner apparatus according to claim 1, wherein said means coupling one of said digital signals to said other amplifier means includes a resistor coupled between said input of said first gate amplifier means and said input of said second gate amplifier means.

8. The digital data and orderwire combiner apparatus according to claim 1, wherein said means coupling one of said digital signals to said other amplifier means includes means for applying said high rate digital signal to an input of both said first and second gate amplifier means with said first amplifier means also having applied to said input said orderwire signal.

9. The digital data and orderwire combiner apparatus according to claim 1, wherein said high rate digital signal is at a rate of between 18-21 MBPS with said low rate digital signal at a rate of about 16 KBPS.

10. The digital data and orderwire combiner apparatus according to claim 1, wherein said high rate digital data signal and said orderwire signal are TTL signals.

11. The digital data and orderwire combiner apparatus according to claim 10, wherein said high rate digital data signal is a NRZ signal.

12. The digital data and orderwire combiner apparatus according to claim 1, wherein said first and second inverting gate amplifier means are NAND gates.

13. The digital data and orderwire combiner apparatus according to claim 1, wherein said output of said second inverting gate amplifier means is coupled to a cable for receiving said combined signal.

14. The digital data and orderwire combiner apparatus according to claim 1, wherein said output of said second inverting gate amplifier means is coupled to a light emitting diode for providing an output optical signal varying according to said combined signal.

* * * * *